United States Patent [19]
Flanigan et al.

[11] Patent Number: 5,531,845
[45] Date of Patent: Jul. 2, 1996

[54] METHODS OF PREPARING GAS GENERANT FORMULATIONS

[75] Inventors: David A. Flanigan, Ogden; Vincent E. Mancini, North Ogden; Michael R. Harper, Brigham City, all of Utah

[73] Assignee: Thiokol Corporation, Ogden, Utah

[21] Appl. No.: 179,728

[22] Filed: Jan. 10, 1994

[51] Int. Cl.⁶ .................................................. D03D 23/00
[52] U.S. Cl. ......................................................... 149/109.6
[58] Field of Search ............................ 149/109.6; 62/8; 264/3.4

[56] References Cited

U.S. PATENT DOCUMENTS

| | | | |
|---|---|---|---|
| 3,653,929 | 4/1972 | Dwyer | 99/199 C |
| 3,779,823 | 12/1973 | Price et al. | 149/19 |
| 3,806,461 | 4/1974 | Hendrickson et al. | 252/188.3 R |
| 3,892,610 | 7/1975 | Huziner | 149/76 |
| 3,897,285 | 7/1975 | Hamilton et al. | 149/41 |
| 3,901,747 | 8/1975 | Garner | 149/42 |
| 3,971,729 | 7/1976 | Timmerman | 252/187 R |
| 3,996,079 | 12/1976 | Divalentin | 149/35 |
| 4,177,227 | 12/1979 | Harvey et al. | 264/3 R |
| 4,179,327 | 12/1979 | Seldner | 156/667 |
| 4,203,786 | 5/1980 | Garner | 149/19.91 |
| 4,238,253 | 12/1980 | Garner. | |
| 4,390,380 | 6/1983 | Camp | 149/8 |
| 4,533,416 | 8/1985 | Poole | 149/35 |
| 5,015,309 | 5/1991 | Wardle et al. | 149/19.1 |
| 5,019,220 | 5/1991 | Taylor et al. | 264/3.4 |
| 5,074,940 | 12/1991 | Ochi et al. | 149/35 |
| 5,197,758 | 5/1993 | Lund et al. | 280/741 |

OTHER PUBLICATIONS

Product Advertisements, "Chemical Equipment", pp. 36D5–36D6, (Mar. 1994).
Product Advertisements, "Chemical Equipment", pp. 18D7–18D8, (Dec. 1993).

*Primary Examiner*—Donald P. Walsh
*Assistant Examiner*—Anthony R. Chi
*Attorney, Agent, or Firm*—Ronald L. Lyons; Madson & Metcalf

[57] ABSTRACT

Novel methods for processing gas generant compositions to produce feed stock are disclosed. The methods of the present invention include utilizing a binding agent and other additives in a mixture of ingredients of gas generant compositions in sufficient quantities that the ingredients of the gas generating material will agglomerate to form granules as the ingredients are mixed. Processing methods, including roll coating, continuous mixing, static mixing, freeze drying, solvent extraction, emulsification, azeotropic distillation, spray drying, fluidized bed processing and particle grinding are also disclosed for use in preparing feed stock for final gas generant products. The methods of the present invention are particularly useful in processing gas generating materials having a non-azide based fuel.

6 Claims, 4 Drawing Sheets

Fig. 7

METHODS OF PREPARING GAS GENERANT FORMULATIONS

BACKGROUND

1. The Field of the Invention

The present invention is related to methods for preparing feed stock of gas generant formulations, more particularly, the present invention is related to methods for preparing non-azide gas generant compositions into a form which may be pressed, extruded or otherwise processed into a final form.

2. Technical Background

Gas generating chemical compositions are useful in a number of different contexts. One important use for such compositions is in the operation of inflatable automotive safety restraint systems, commonly referred to as "air bags." Air bags are gaining in acceptance to the point that many, if not most, new automobiles are equipped with such devices. Indeed, many new automobiles are equipped with multiple air bags to protect the driver and passengers.

In the context of automobile air bags, sufficient gas must be generated to inflate the device within a fraction of a second. Between the time the car is impacted in an accident, and the time the driver would othrwise be thrut against the steering wheel or dash, the air bag must fully inflate. As a consequence, nearly instantaneous gas generation is required.

There are a number of additional important design criteria that must be satisfied. Automobile manufacturers and others set forth the required criteria which must be met in detailed specifications. Preparing gas generating compositions that meet these important design criteria is an extremely difficult task. These specifications require that the gas generating composition produce gas at a required rate. The specifications also place strict limits on the generation of toxic or harmful gases or solids. Examples of restricted gases include carbon monoxide, carbon dioxide, $NO_x$, $SO_x$, and hydrogen sulfide.

Automobile manufacturers have also specified that the gas be generated at a sufficiently and reasonably low temperature so that the occupants of the car are not burned upon impacting an inflated air bag. If the gas produced is overly hot, there is a possibility that the occupant of the motor vehicle may be burned upon impacting a just deployed air bag. Accordingly, it is necessary that the combination of the gas generant and the construction of the air bag isolates automobile occupants from excessive heat. All of this is required while the gas generant maintains an adequate burn rate. In the industry, burn rates in excess of 0.5 inch per second (ips) at 1,000 psi, and preferably in the range of from about 1.0 ips to about 1.2 ips at 1,000 psi are generally desired.

Another related but important design criteria is that the gas generant composition produces a limited quantity of particulate materials. Particulate materials can interfere with the operation of the supplemental restraint system, present an inhalation hazard, irritate the skin and eyes, or constitute a hazardous solid waste that must be dealt with after the operation of the safety device. The latter is one of the undesirable, but tolerated in the absence of an acceptable alternative, aspects of the present sodium azide materials.

In addition to producing limited, if any, quantities of particulates, it is desired that at least the bulk of any such particulates be easily filterable. For instance, it is desirable that the composition produce a filterable, solid slag. If the solid reaction products form a stable material, the solids can be filtered and prevented from escaping into the surrounding environment. This also limits interference with the gas generating apparatus and the spreading of potentially harmful dust in the vicinity of the spent air bag which can cause lung, mucous membrane and eye irritation to vehicle occupants and rescuers.

Both organic and inorganic materials have also been proposed as possible gas generants. Such gas generant compositions include oxidizers and fuels which react at sufficiently high rates to produce large quantities of gas in a fraction of a second.

At present, sodium azide is the most widely used and accepted gas generating material. Sodium azide nominally meets industry specifications and guidelines. Nevertheless, sodium azide presents a number of persistent problems. Sodium azide is relatively toxic as a starting material, since its toxicity level as measured by oral rat $LD_{50}$ is in the range of 45 mg/kg. Workers who regularly handle sodium azide have experienced various health problems such as severe headaches, shortness of breath, convulsions, and other symptoms.

In addition, sodium azide combustion products can also be toxic since molybdenum disulfide and sulfur are the oxidizers which are commonly used with sodium azide. The reaction of these materials produces toxic hydrogen sulfide gas, corrosive sodium oxide, sodium sulfide, and sodium hydroxide powder. Rescue workers and automobile occupants have complained about both the hydrogen sulfide gas and the corrosive powder produced by the operation of sodium azide-based gas generants.

Increasing problems are also anticipated in relation to disposal of unused air bag systems in demolished cars. The sodium azide remaining in such supplemental restraint systems can leach out of the demolished car to become a water pollutant or toxic waste. Indeed, some have expressed concern that sodium azide, when contacted with battery acids following disposal, forms explosive heavy metal azides or hydrazoic acid.

In response to the disadvantages attendant with the use of azide-based fuels for gas generant compositions, many new compositions have recently been developed. These compositions include those disclosed and claimed in co-pending U.S. patent application Ser. No. 08/101,396, filed Aug. 2, 1993 and entitled Bitetrazoleamine Gas Generant Compositions and Methods of Use, and incorporated herein by reference. As disclosed in that patent application, a bitetrazoleamine ("BTA"), or a salt or a complex thereof is used as a fuel with copper oxide employed as a preferred oxidizer. The composition can comprise from about 15 to about 35 weight percent fuel and from about 60 to about 85 weight percent oxidizer.

Other recently developed gas generant compositions include those disclosed and claimed in co-pending U.S. patent application Ser. No. 08/103,768, filed Aug. 10, 1993 and entitled Thermite Compositions for use as Gas Generants, and incorporated herein by reference.

While many of these new compositions may be easily processed on a laboratory scale, such processing techniques do not readily lend themselves to full-scale processing. Bulk processing of gas generant materials is generally conducted in two phases: a "feed stock" is initially prepared from which a final gas generant product may be produced. The final product is generally produced through pressing or extrusion. Currently, the most prevalent final product is a pressed tablet having a diameter of approximately 0.25 inches. In an automobile gas bag, many of these tablets, sometimes referred to as "pellets" or "pills," may be utilized to obtain a sufficient quantity of gas generant to inflate the gas bag.

Pellets are generally produced by placing a quantity of feed stock in a pellet press. The feed stock is then physically pressed into a die having the shape of that desired of the pellet. After pressing, the pellet may be removed from the mold.

In order to effectively produce gas generant pellets, the feed stock must have bulk flow characteristics which enable it to easily flow from a pellet press feed bin into the die. Also, the feed stock must effectively release from the die when pressing is complete. The pellet which is produced must also have substantial crush strength so that it will not crumble or otherwise erode when subjected to the forces to be encountered when positioned in the steering wheel of a vehicle over a period of several years.

A non-azide based gas generant formulation which is substantially superior to an azide-based formulation in terms of ballistics and safety cannot be effectively utilized unless it can be processed efficiently. One difficulty faced by some new formulations is that the composition must hold true on a macro-molecular level. In contrast, typical azide-based compositions can tolerate small agglomerations of virgin sodium azide unaccompanied by an oxidizer. Because the composition tolerances are quite lenient, it is not necessary to process such azide-based compositions to ensure that each granule of sodium azide is physically attached to an oxidizer.

Many of the new, superior performing, generant compositions, however, appear to require strict composition balances at the macro-molecular level. Hence, many of the known processing techniques for azide-based compositions will not work for processing new, non-azide based compositions without significant process alterations.

From the foregoing, it will be appreciated that it would be an advancement in the art to provide methods for processing gas generant compositions to produce feed stock which can economically and efficiently be pressed to form a gas generant tablet which will readily release form the die and have sufficient crush strength to meet industry standards.

Indeed, it would be an additional advancement in the art to provide such methods for processing gas generant compositions, particularly new, non-azide based compositions, which methods will permit bulk processing to achieve more precise compositions on a macro-molecular level.

Such a methods are disclosed and claimed herein.

BRIEF SUMMARY AND OBJECTS OF THE INVENTION

The present invention is directed to novel methods for preparing gas generant feed stock. According to one method of the present invention, gas generant feed stock is prepared by initially obtaining a desired quantity of ingredients measured in predetermined ratios according to the composition of a gas generating material having a non-azide based fuel, such as a composition with a fuel comprising a bitetrazoleamine and an oxidizer comprising copper oxide. The ingredients are then mixed together in a carrier solvent such as water to enhance surface contact between the ingredients. The carrier solvent is added by atomizing it into a fog and introducing the fog into the ingredients.

A binding agent which is preferably soluble in the carrier solvent is included in the mixture in sufficient quantities that the ingredients of the gas generating material will agglomerate to form granules as the ingredients are mixed. The ingredients are dried to remove the carrier solvent after the ingredients have sufficiently agglomerated.

The binding agent preferably has a melt point of from about 200 degrees to about 500 degrees centigrade and includes one or more of the group comprising nitrates, nitrogen and oxygen in sufficient quantities to balance the mixture of the gas generant ingredients. The binding agent is also capable of being dried to an anhydrous state.

The binding agent is selected from the group comprising nitrates, sugars, agars, gums, coupling agents, monomers and polymers having solubility in a carrier solvent greater than about two percent, saponified waxes and oils, siloxanes, carbonates, resinate salts, stable oxides and silicates.

The binding agent is added to comprise from about 0.01 to about 2.5 weight percent of the feed stock and preferably only comprises from about 0.01 to about 1.5 weight percent of the feed stock which is produced.

According to an additional method of the present invention, gas generant feed stock is prepared by obtaining a desired quantity of ingredients measured in predetermined ratios according to the composition of a gas generating material having a non-azide based fuel. The ingredients are introduced into a rotatable mixer and mixed to cause the ingredients within the mixer to agglomerate to form granules. The mixture may then be dried to an anhydrous state.

The mixer includes a series of screens having a mesh size corresponding to the size of granules desired. The screen is configured such that agglomerated granules which do not penetrate the screen may be removed from the mixture.

According to a further method of the invention, gas generant feed stock is produced by obtaining a desired quantity of ingredients measured in predetermined ratios according to the composition of a gas generating material having a non-azide based fuel and introducing the ingredients into a continuous mixer at different locations along the mixer. The mixer includes a stationary housing within which a mixing blade is rotatably disposed. Water is added to the mixture and the blade is rotated to thereby cause the ingredients within the mixer to agglomerate to form granules. Finally, the mixture is dried under a vacuum to an anhydrous state.

A binding agent is preferably included in the mixture in sufficient quantities that the ingredients of the gas generating material will agglomerate to form granules as the mixing blade is rotating.

An additional method of the present invention includes obtaining a desired quantity of ingredients measured in predetermined ratios according to the composition of a gas generating material having an oxidizer and a non-azide based fuel and introducing the ingredients into a static mixer to cause the ingredients within the mixer to agglomerate to form granules.

The static mixer is preferably filled with an inert gas, such as argon or nitrogen, to provide a static dissipating environment in which to process the ingredients.

The static mixer is configured with an angled ramp over which the ingredients may be passed to thereby induce larger particle agglomeration between the fuel and the oxidizer. Angled screens are also provided with a predetermined mesh size for controlling the size of agglomerates which are removed from the mixer.

In accordance with a further method of the invention, a desired quantity of ingredients measured in predetermined ratios according to the composition of a gas generating material are obtained and mixed together in a carrier solvent such as water to dissolve at least one of the ingredients in the solvent. A binding agent is also preferably including in the mixture.

The mixture is then supercooled under pressure in a non-contact heat exchanger, thereby inducing the ingredients to fall out of solution. The mixture is then frozen by introducing it to a refrigerant liquid such as nitrogen, ammonia or carbon dioxide. The refrigerant liquid is then separated from the ice and granules. Finally, heat is added while controlling the pressure to cause sublimation of the frozen solvent.

A further method of the invention includes initially obtaining a desired quantity of ingredients measured in predetermined ratios according to the composition of a gas generating material. This method is particularly useful for preparing feed stock of gas generating materials which include a non-azide based fuel. The ingredients are mixed together in a first solution, preferably water, wherein at least a portion of at least one of the ingredients of the gas generating material becomes dissolved in the first solution.

A second solution, such as a polar solvent, is then mixed with the first solution. This is preferably accomplished by utilizing a drop tower filled with the second solution and introducing the first solution into the top of the drop tower. The second solution is selected such that the second solution is miscible with the first solution and such that any ingredients of the gas generating material which are soluble in the first solution have substantially no solubility in the second solution. Agglomerates of gas generating material which precipitate out of the mixture of the first and second solutions are then removed. The precipitate may then be dried to an anhydrous state.

A binding agent is preferably included in the mixture in sufficient quantities that the ingredients of the gas generating material will agglomerate to form granules as the agglomerates precipitate out of the mixture of the first and second solutions.

A further method of the present invention includes obtaining a desired quantity of ingredients measured in predetermined ratios according to the composition of a gas generating material, preferably one having a non-azide based fuel. The ingredients are mixed together in a first solution, preferably water, such that at least a portion of at least one of the ingredients becomes dissolved in the first solution.

A second solution, such as trichloroethane, tetrachloroethane or nonane, is then introduced into the mixture. The second solution is selected such that it is immiscible with the first solution and such that any ingredients of the gas generating material which are soluble in the first solution have substantially no solubility in the second solution.

The mixture is then physically emulsified and agglomerates of gas generating material which precipitate out of the mixture are removed, such as by processing with a centrifugal separator or a settling tank. A binding agent may be included in the mixture in sufficient quantities that the ingredients will agglomerate to form granules as the mixture is emulsified.

In accordance with an additional method of the present invention for producing gas generant feed stock, a desired quantity of ingredients measured in predetermined ratios according to the composition of a gas generating material, such as a gas generating material including a non-azide based fuel. The ingredients are mixed together in a first solvent such as water wherein at least a portion of at least one of the ingredients of the gas generating material becomes dissolved in the first solvent.

A second solvent, such as benzene, toluene, ethanol or propanol, is then introduced into the mixture. The second solvent is selected such that it is miscible with the first solvent and will form an azeotrope with the first solvent.

The ingredients of the gas generating material are then mixed together with the first solvent and the second solvent the solvents are azeotropically distilling off. A binding agent may preferably be included in the mixture in sufficient quantities that the ingredients will agglomerate to form granules as the ingredients are mixed.

In accordance with the teachings of a further method of the present invention, gas generant feed stock is prepared by initially obtaining a desired quantity of ingredients measured in predetermined ratios according to the composition of a gas generating material having a non-azide based fuel. The ingredients are mixed together in a first solution wherein at least a portion of at least one of the ingredients of the gas generating material becomes dissolved in the first solution to form a mixture. The first solution may include water; however, the use of a first solution which does not include water reduces the thermal sensitivity of the mixture.

The mixture is then sprayed through a nozzle into an air stream or in a vacuum. The nozzle is configured to separate the mixture into droplets which will dry to form agglomerates as the droplets travel through the air stream. The agglomerates may then be collected and processed into a final product.

A binding agent is preferably included in the mixture in sufficient quantities that the ingredients will agglomerate to form granules as the mixture is sprayed into the air stream.

An additional method of the present invention includes obtaining a desired quantity of ingredients measured in predetermined ratios according to the composition of a gas generating material having a non-azide based fuel. The ingredients are preferably obtained in a dry state and, as such, are introduced into an inlet end of a fluidized bed. A supply of fluid media is injected through the fluidized bed to mix the ingredients together.

A solvent such as water is introduced into the ingredients at a temperature of from about 60 to about 85 degrees centigrade while continuing to mix the ingredients, thereby causing the ingredients to agglomerate.

The ingredients are then urged to a drying zone where the solvent is removed from the ingredients after sufficient agglomeration has occurred. The solvent is removed by preheating the fluid media and injecting it into the fluidized bed at the drying zone. The pressure at which the fluid media is injected into the drying zone is lowered to thereby prevent the agglomerated granules from being broken up.

According to an additional method of the invention, a gas generant feed stock is obtained by initially obtaining a desired quantity of ingredients measured in predetermined ratios according to the composition of a gas generating material. The ingredients are then subjected to a particle size reduction device which simultaneously grinds and mixes the materials. The ingredients may be agglomerated following grinding by including a binding agent with the ingredients and mixing the ingredients together. The binding agent may be added in sufficient quantities that the ingredients will agglomerate to form granules.

Thus, it is an object of the present invention to provide methods for processing gas generant compositions to produce feed stock which can be economically and efficiently pressed to form a gas generant tablet which will readily release form the die and have sufficient crush strength to meet industry standards.

It is an additional object of the present invention to provide such methods for processing gas generant compositions, particularly new, non-azide based compositions, which methods will permit bulk processing to achieve more precise compositions on a macro-molecular level.

These and other objects and advantages of the present invention will become more fully apparent by examination of the following description of the preferred embodiments and the accompanying drawings.

BRIEF DESCRIPTION OF THE DRAWINGS

In order that the manner in which the above-recited and other advantages and objects of the invention are obtained may be understood, a more particular description of the invention briefly described above will be rendered by reference to the appended drawings. Understanding that these drawings only provide information concerning typical embodiments of the invention and are not therefore to be considered limiting of its scope, the invention will be described and explained with additional specificity and detail through the use of the accompanying drawings, in which.

DETAILED DESCRIPTION OF THE PREFERRED EMBODIMENTS

The present invention relates to various processes for preparing feed stock from gas generant materials which may then be pressed into pellets or extruded into useful geometries. Examples of gas generant materials which may be processed according to the teachings of the present invention include compositions comprising a non-azide fuel and an oxidizer. Some of the methods of the present invention may also be useful for the processing of azide based gas generant materials.

USE OF A BINDING AGENT

According to one method of the present invention, gas generant feed stock is prepared by initially obtaining a desired quantity of ingredients measured in predetermined ratios according to the gas generant formulation. The ingredients of the gas generant material are mixed or otherwise processed to cause particle-particle contact among between the ingredients. A binding agent is included in the mixture in sufficient quantities that the ingredients of the gas generating material will agglomerate to form granules as they are mixed. The agglomerates may then be used as feed stock and pressed into pellets, extruded and formed into pellets, or otherwise formed into a desired shape.

Presently preferred gas generant compositions for use with this method include those compositions having ingredients which will not agglomerate at ambient conditions. Many of the non-azide based compositions meet this criteria. One such composition is the BTA/CuO composition mentioned above.

According to this method, the binding agent is preferably selected to be soluble when subjected to the process conditions. Because the sensitivity of such energetic materials is generally reduced in the presence of water, such materials are generally processed in a wet or slurried state.

For some processes, a carrier solvent other than water may be utilized. In such a process, the binding agent should be selected to be solvent in that carrier solvent. Other processes may permit the fuel and oxidizer to be processed in a dry state. For such processes, the binding agent may be selected to be soluble in its own carrier solvent. After application of the dissolved binding agent, the mixture may be dried to remove the carrier solvent. If the binding agent will flow under pressure to form a mechanical matrix, it would operate effectively without being soluble.

Any material capable of acting as a tactifier is a suitable candidate for the binding agent. One of the principal functions of the binding agent is that it will cause the fuel and oxidizer to adhere to each other to form a mechanical bond. This may also be accomplished by utilizing two or more components which, when combined, will produce a tactifier.

The binding agent may be selected such that it is consumed during the combustion of the gas generant. Such a binding agent preferably has a low melting point. Alternatively, a binding agent which is not consumed, but remains after combustion of the generant as a metallic or ceramic slag, may also be utilized. It will be appreciated that a combination of these two types of binding agents may also be used, a portion of which will be consumed with the remainder forming a slag. For most gas generant compositions, the melting point of the binding agent should be between about 200 and about 500 degrees centigrade.

It is presently preferred that the binding agent also be selected to have a relatively high crystalline strength. By selecting a binding agent having a higher crush strength than the lowest crush strength of any of the other ingredients in the gas generant material, the binding agent is prevented from becoming the weak link in the final product.

The binding agent may be advantageously selected to contain nitrogen, nitrates and/or oxygen to aid in balancing the mixture.

As with any additives to the gas generant ingredients, the binding agent is preferably capable of being dried to an anhydrous state. Many of the fuels utilized in recently developed gas generant compositions are water scavengers. Hence, unless the binding agent can be dried to an anhydrous state, the danger may exist that any remaining water in the composition will have an adverse affect on the burn rate of the composition.

In an application where an organic binding agent is to be utilized in a composition to be placed in an air bag, care must be exercised to ensure that any carbon monoxide produced during their combustion is kept within acceptable levels.

Examples of suitable binding agents include organic and inorganic nitrate materials such as 3,5 dinitrotoluene, isopropyl nitrate, potassium nitrate, sodium nitrate or lithium nitrate. Other acceptable binding agents include sugars such as glucose, dextrose or fructose; agars such as agar agar or gelatin; and gums such as xythium gums, rubber tree gums or synthetic gums (latex). Additional binding agents may include coupling agents such as organo-titanates, organo-zirconates, organo-aluminates and organo-silicates; monomers and polymers having a solubility of about two percent or greater in a carrier solvent, such as polyvinyl alcohol, polyvinyl acetate, latex, organic polymers, nitrated polymers, or adizo-based monomers and polymers; saponified waxes and oils such as soap; and siloxanes such as silicone oils and organo-silicone liquids. Also, other organic and inorganic fillers that act as binding agents would be suitable. These include carbonates such as calcium carbonate, sodium carbonate, sodium bi-carbonate, aluminum carbonate; resinate salts of carboxylic acids (stearates, palmates, linoleates, etc.); stable oxides such as titanium dioxide, aluminum oxide, etc.; and other silicates.

For some applications it may be desirable to select a binding agent which will act as a burn rate catalyst for the gas generant material. Such binding agents may include the carbonates, resinates, carboxylate salts, stable oxides, nitrates and silicates.

The binding agent may be added to comprise from about 0.01 to about 2.5 weight percent, and preferably comprises from about 0.01 to about 1.5 weight percent. Care must be taken that the binding agent is not added in quantities which would adversely and undesirably affect the ballistic properties of the gas generant material.

A variety of methods may be employed to apply the binding agent to the mixture. The binding agent may be included in the mixture by merely introducing it to the gas generant ingredients as they are being mixed. Alternatively, the binding agent may be mixed with one or more of the ingredients prior to mixing all of the ingredients together.

One presently preferred method of applying the binding agent is to atomize, or "fog," the binding agent and introduce it to the mixture in an atomized form, thereby enhancing the distribution of the binding agent in the mixture and minimizing the amount of binding agent required to achieve an appropriate level of agglomeration of the mixture.

FLOW AGENTS AND PROCESS LUBRICANTS

According to one method of the present invention, a flow agent or process lubricant may be added to the gas generant ingredients at some point during the processing of the feed stock. Treating the mixture with a flow agent will facilitate the flow of the mixture from the bins into the pellet press. The use of a flow agents or process lubricants also lubricates the ingredients thereby providing a higher bulk density in any resulting product.

When gas generant feed stock is to be fed into a pellet press to produce gas generant pellets, the material must cleanly release from the press die if consistently acceptable tablets are to be produced. Because some formulations will not easily release from the dies, a flow agent may be added to the mixture to enhance the bulk flow properties of the feed stock. The inclusion of lubricating additives according to this method of the invention will provide lubrication and facilitate the removal of the pellets from the pellet press.

Flow agents and process lubricants used according to this method may be selected to provide acceptable reduction in the bulk friction properties according to the particular gas generant composition being formulated. These additives should be selected such that they and their combustion products are non-toxic.

The flow agent may be advantageously selected to have either fuel, oxidizer or inert properties and to include nitrates and/or oxygen to aid in balancing the gas generant composition. As with the use of a binding agent, the flow agent should also be capable of being dried to an anhydrous state to thereby minimize any effect it will have on the burn rate of the gas generant.

Suitable flow agents which may be used according to this method of the present invention include anhydrous silicates such as Tolonox (400 series) commercially produced by Cabot Industries, and their "Cab-O-Sil" family of flow agents. Minute doping of the gas generants with acetates, silicates and stable oxides will also increase their flowability. Alternatively, drying agents or super drying agents such as alumina and silica gel will also act as acceptable flow agents.

As with the use of binding agents, a flow agent capable of acting as a burn rate catalyst may also be advantageously utilized in many applications. Examples of such flow agents include silicates, carbonates and fumed silica.

According to this method, the flow agent should not exceed about 0.5 weight percent of the total formulation, and preferably does not exceed about 0.001 weight percent of the total formulation. By minimizing the amount of flow agent utilized, any impact on the burn rate or other ballistic properties of the composition is held to a minimum.

The flow agent may be included in the mixture by merely introducing it to gas generant ingredients as they are being mixed. Alternatively, the flow agent may be mixed with one or more of the ingredients prior to mixing all of the ingredients together. In order to increase the bulk density of the feed stock, however, the flow agent is preferably added to the ingredients after agglomeration. Adding the flow agent after agglomeration also minimizes the amount of flow agent which is needed.

OTHER ADDITIVES

In addition to binding agents and flow agents, other additives may also be included while processing gas generant materials according to the teachings of the present invention. While binding agents and flow agents may be selected to also act as a burn rate catalyst, burn rate catalysts may be utilized which do not also act as a binding agent or a flow agent.

It is presently preferred to select non-toxic materials for use as burn rate catalysts which will be entirely consumed during the combustion of the gas generant material or which will solidify during combustion, remaining in the generator with the slag produced during combustion. Alternatively, materials which can be captured in the filtering system of the gas generator may also be employed, thereby avoiding the expulsion of particulate debris into the air bag. As a further alternative, burn rate catalysts producing particulates less than about 10 microns ("PM10") may be employed if the amount of particulate debris produced fall within the Threshold Limit Values ("TLV") of the industrial standards for PM10 emissions.

Exemplary of burn rate catalysts which may be employed according to the teachings of the present invention are metallic oxides such as iron oxide, aluminum oxide, titanium oxide and silicone dioxide. Other burn rate catalysts which may be successfully utilized include burn rate suppressors such as oxamides.

Additional additives which could be utilized include tracing agents. Tracing agents operate to color or dope the gas generant material, thereby permitting easy detection in the event of leaks. Tracing agents may include thermally stable inorganic and organic dyes. Volatile organic dyes may also be employed if the particulate condensate which results following combustion is maintained with PM10 standards.

Depending on the nature of the ingredients being mixed according to the processes of the present invention, the possibility of electrostatic buildup in the mixing region may occur. Because of the obvious dangers inherent in the event of an ignition due to electrostatic discharge, it is presently preferred to conduct mixing in an inert, oxygen-free environment. This may be easily accomplished by utilizing an inert gas, such as argon or nitrogen, within the mixer. The use of an inert gas to create an oxygen-free environment may be advantageously utilized in connection with any of the methods disclosed herein.

ROLL COATING

Figure 1:
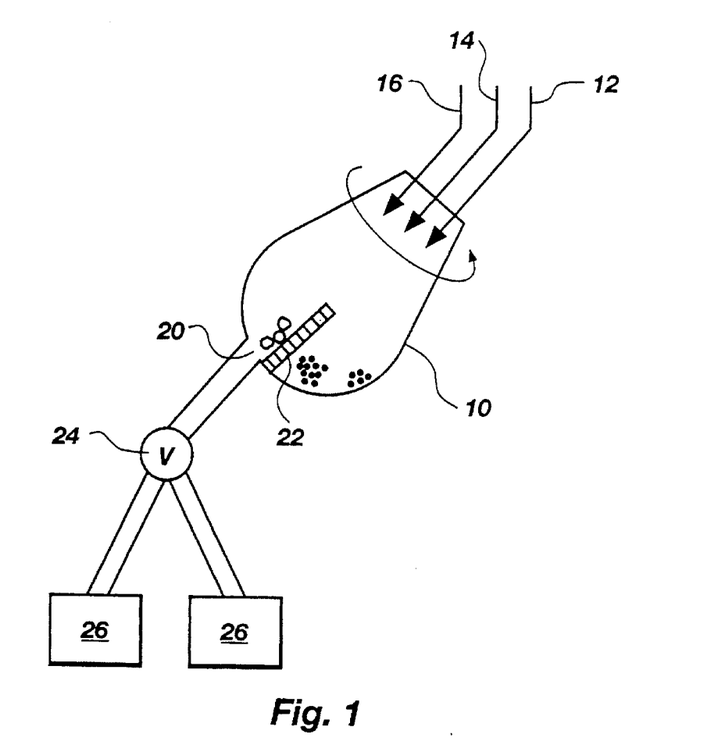
FIG. 1 is a schematic drawing of a roll coating process in accordance with the teachings of the present invention.

One method for preparing gas generant feed stock according to the teachings of the present invention includes obtaining a desired quantity of ingredients measured in predetermined ratios according to the composition of a gas generating material. The ingredients are then introduced into a rotatable mixer 10, as illustrated in FIG. 1. The ingredients of the gas generant material may be introduced into the mixer in either a wet or dry state. It is presently preferred to add the fuel in a hydrated state and add the oxidizer in a dry state where a wetting fog or spray will aid agglomeration. In addition, the use of a vacuum will aid in controlling the size of agglomerates which are formed.

Mixer 10 may include any of those conventional mixers having a rotatable cavity for holding ingredients to be mixed such as commercially available pelletizers. Means (not shown) are provided to drive the rotation of the mixer 10. The ingredients may include a fuel 12, an oxidizer 14 and additives 16. Additives 16 may include any of those additives discussed herein such as a combination of binding agents or flow agents, and may be introduced into the mixture through an atomizer or other introduction mechanism such as liquid feed.

The mixer 10 is then rotated with sufficient angular velocity to cause the ingredients within the mixer to agglomerate to form granules or agglomerates. As the mixer 10 is rotated, the ingredients are subjected to a gentle "tumbling" action, i.e., the ingredients are placed in contact with each other such that substantial particle-particle contact occurs, thereby providing opportunity for agglomeration of the ingredients to occur.

As the mixer 10 rotates, the ingredients are carried up the side of the mixer until the force of gravity forces them to fall to the bottom of the mixer where they are again carried upwardly along the side of the mixer. Hence, the action imposed on the ingredients by the rotational mixer 10 consists of repeated periods of mixing followed by periods of prolonged contact. As the ingredients fall to the bottom of the mixer, mixing of the ingredients occurs. As the ingredients are carried upwardly along the sides of the mixer, they remain in substantially uninterrupted contact with each other. Indeed, the contact time provided by the use of the rotational mixer promotes the formation of granules by agglomeration. The angle or pitch of the rotating vessel may be varied to control the contact time of the particles. The speed with which the mixer is rotated must not be so fast that the centrifugal forces imposed on the ingredients will cause them to adhere to the wall of the mixer 10 throughout its entire range of rotation.

The mixing of the ingredients may be conducted in a vacuum, thereby enabling any water or other carrier solvent to be removed through reduced pressure boiling. Reduced pressure boiling may also be utilized to place the generants in an anhydrous state, such as is generally preferred when preparing non-azide gas generant compositions.

The mixer 10 is preferably configured with a centerline discharge port 20 through which agglomerates may exit the mixer. A screen 22 is positioned at the port 20 over which granules attempting to exit the mixer must pass. The mesh size of the screen 22 will vary according to the agglomerate requirements for the particular composition being prepared. However, it is generally contemplated that screen sizes of from about 10 mesh to about 200 mesh will be acceptable. For example, if the feed stock is to be pressed into tablets having a ¼ inch diameter, a screen from about 20 to about 60 mesh is preferably utilized.

The screen 22 is positioned relative to the discharge port 20 such that particles which pass through the screen 22 will fall back into the mixer 10 where they are exposed to additional tumbling action and permitted to further agglomerate. Thus, utilizing 200 mesh screen will permit agglomerates less than about 100 microns to pass, thereby ensuring that all agglomerates exiting the mixer 10 are larger than about 100 microns—a size generally preferred for the production of gas generant feed stock.

By controlling the amount and type of binder material utilized in the mixture and the processing pressure, the maximum agglomerate size can be limited within acceptable sizes. Hence, in this preferred embodiment, no screen is provided to prevent agglomerates deemed to be too large from exiting the mixer 10. However, it should be appreciated that an additional screen could be provided to control the maximum size particles which are permitted to exit the mixer 10.

Agglomerates sufficiently large to pass over the screen 22 exit the mixer 10 through the discharge port 20. A diverter 24 is preferably provided along the discharge path after the discharge port 20 to enable divert the feed stock into one of two containers 26. When one container is filled, the diverter 24 may be actuated to divert the flow into the other container, thereby enabling the process to be conducted in a reduced pressure environment.

It should be appreciated that this method readily lends itself to effective use as either a batch process or a "semi-batch" process. When preparing gas generant materials according to this method of the invention in a semi-batch process, the ingredients are processed until a predetermined amount of agglomerates are collected in containers 26, additional ingredients are then added to mixer 10. A mixer having a centerline discharge, such as that illustrated in FIG. 1, is particularly suited for use in semi-batch processing.

Continuous roll coating process may also be conducted in accordance with this method of the invention. To perform continuous processing, a mixer with an extended side wall would be employed, such as by using a rotary dryer or drum. The mixer would preferably be positioned at an angle to facilitate the flow of ingredients from one end of the mixer to the other. Alternatively, flights within the mixer could be employed to push the material from the entry to the discharge port.

CONTINUOUS MIXING

An additional method of preparing gas generant feed stock in accordance with the present invention comprises obtaining a desired quantity of ingredients measured in predetermined ratios according to the composition of a gas generating material and introducing the ingredients into a continuous mixer. The continuous mixer includes a stationary housing within which a mixing blade is rotatably disposed. Exemplary of such mixers is the twin-screw extruder 40 illustrated in FIG. 2. Other mixers which may be successfully utilized in accordance with this method of the invention include "double ribbon blenders" manufactured by J. H. Day, "ribbon blenders" manufactured by Babcock-Gardner, "ribbon mixers" manufactured by Patterson, "paddle blenders" manufactured by Marion and co-kneaders such as the model 1000 co-kneader manufactured by APV of Saginaw, Mich.

Figure 2:
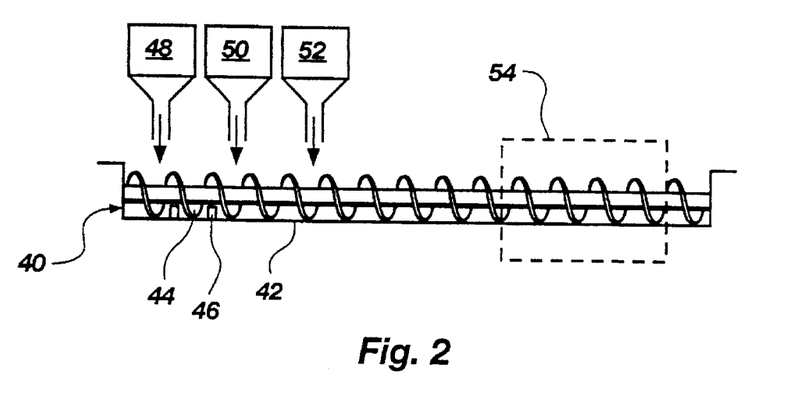
FIG. 2 is a schematic drawing of a continuous process according to the present invention.

The twin-screw mixer 40 includes a housing 42 to which two mixing screws 44 are disposed for rotation. Attached to the housing are wiper blades 46 which wipe the screws 44 as they rotate, thereby inducing mixing of the ingredients within the mixer. As the screws 44 rotate, ingredients within the mixer are urged by the screws 44 along the length of the mixer.

According to this method, the ingredients used in formulating the gas generant feed stock may be introduced into the mixer in stages. Thus, as illustrated in FIG. 2, a fuel 48 may be added initially. Further down the length of the mixer 40, a binding agent 50, such as those discussed above, may be added and mixed in with the fuel 48. Finally, an oxidizer 52 may be added to the mixture of fuel 48 and binding agent 50 and mixed to form the final feed stock. As the mixing screws 44 rotate, the ingredients are mixed and caused to agglomerate into granules. Loss-in-weight feeders may be utilized to carefully control the weight percentages of the composition. For formulations based on volume, volumetric feeders may be employed.

The relative position of the ingredient feeders may be adjusted according to the particular application. Thus, although the illustrated embodiment introduces the various ingredients into the mixer in stages, this method of the invention also contemplates the introduction of all ingredients at the same location within the mixer. However, it is believed that greater control over the mixing process may be achieved by mixing the ingredients in stages, thereby producing a more consistently formulated final product.

A drying stage may be included within this method of the invention. According to one such embodiment, the mixture is subjected to a vacuum 54 to reduce the pressure to about one mm Hg and heated to about 75 degrees centigrade to remove water from the mixture.

STATIC MIXING

Figure 3:
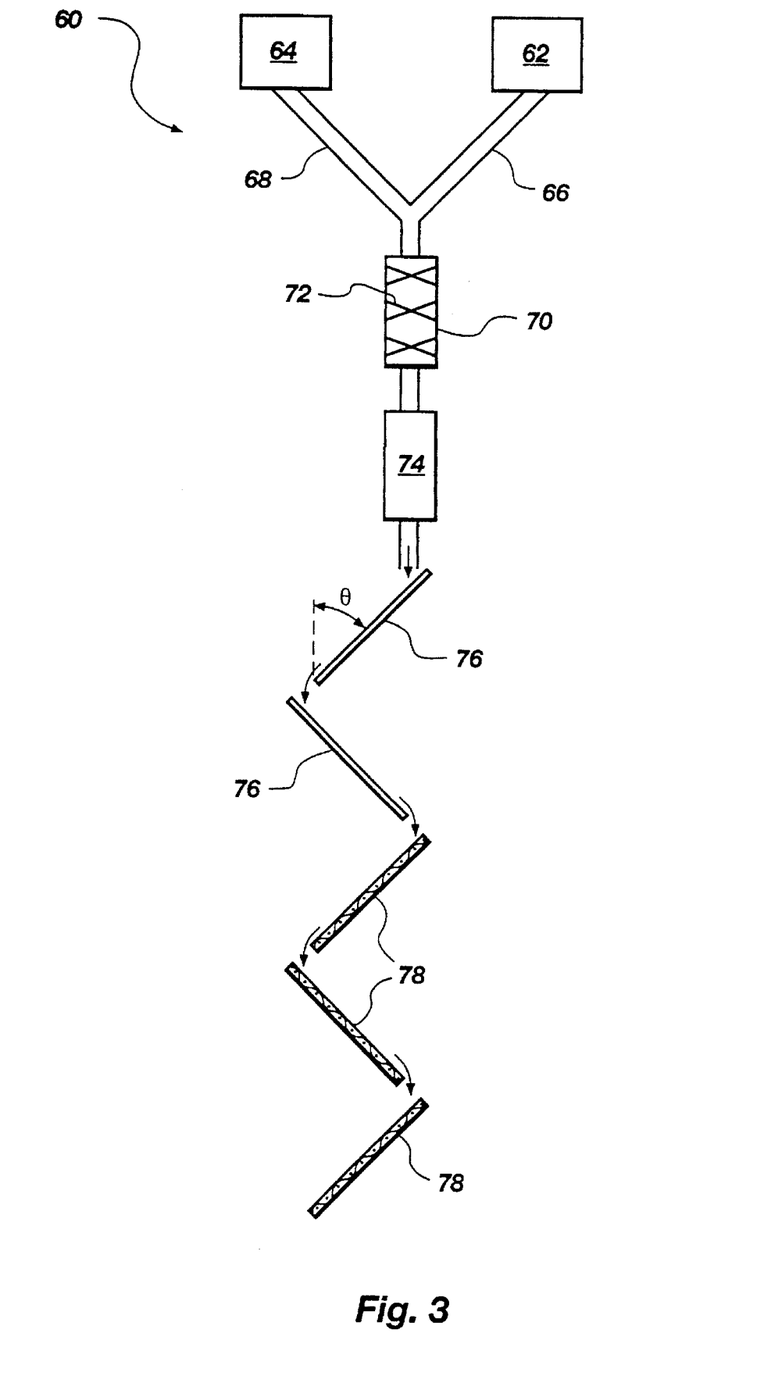
FIG. 3 is a schematic drawing of a process of the present invention which utilizes a static mixer.

A further method of the present invention includes obtaining a desired quantity of ingredients measured in predetermined ratios according to the composition of a gas generating material and introducing the ingredients into a static mixer. As illustrated in FIG. 3, a static mixer 60 configured for use in accordance with this method of the invention includes a fuel bin 62 and an oxidizer bin 64. A fuel feed tube 66 is attached to the fuel bin 62 and a corresponding oxidizer feed tube 68 is attached to the oxidizer bin 64.

In this preferred embodiment, the feed tubes 66 and 68 are gravity fed. The tubes 66 and 68 thus extend downwardly into a common mixing region 70 in which static mixing rods 72 extend randomly across the flow path. Beneath the mixing region 70, a fog zone 74 is provided in which a binding agent may be added to the mixture. In this preferred embodiment, a pair of angled ramps 76 are disposed beneath the fog zone 74. The angled ramps 76 are followed by a plurality of angled screens 78, both of which are disposed at an angle θ to the flow path. One of skill in the art will appreciate that the number of angled ramps and angled screens which are employed may be varied to suit the particular composition being prepared. Additionally, the angle of disposition to the flow path of each ramp and screen may be modified to optimize the process for a particular application.

In operation, a suitable fuel is provided in fuel bin 62 and a suitable oxidizer is provided in oxidizer bin 64. The diameter of the fuel feed tube 66 and the oxidizer feed tube 68 are adjusted according to the terminal velocities of the fuel 62 and the oxidizer 66 such that the appropriate ratios of fuel and oxidizer are fed into the mixing region 70.

As the fuel and oxidizer reach the mixing region 70, they collide with the mixing rods 72 which lie within the flow path. This results in substantial mixing of the fuel and oxidizer.

Depending on the nature of the ingredients being mixed in the static mixture, the possibility of electrostatic buildup in the mixing region 70 may occur. Because of the obvious dangers inherent in the event of electrostatic discharge, it is presently preferred to conduct the static mixing in an inert environment. This may be easily accomplished by utilizing an inert gas, such as argon or nitrogen, within the static mixer.

After passing through the mixing region 70, the mixed fuel and oxidizer travel through a fog zone 74. The fog may comprise an atomized binding agent, such as any of those disclosed herein. In the fog zone 74, the binding agent 74 comes into contact with fuel and oxidizer particles. Thus, the density of the fog zone 74 may be controlled according to how much binding agent 74 should be added to the ingredient mixture.

The particles then come into contact with the angled ramps 76 which induce particle-particle contact between the fuel and the oxidizer. Because the mixture now includes the binding agent, the ingredients will readily agglomerate into granules as they travel along the angled ramps 76. As the granulated mixture reaches the angled screens 78, the granules larger than a predetermined size may be readily separated for use as feed stock. Thus, the mesh size of the screens 78 is selected according to the desired size of agglomerates.

In this preferred embodiment, the angle of disposition θ between the ramps 76 and screens 78 and the flow path is preferably about 45 degrees. One of skill in the art will appreciate however that the optimal angle of disposition θ may vary according to the particular ingredients being mixed and according to the desired granule size being sought.

Granules falling through the screens 78 may be reintroduced into the mixer at the fog zone 74. Alternatively, particles which have not yet attained the minimum granule size may be introduced into a separate process comprising an additional fog zone 80, angled ramps 82 and angled screens 84, as illustrated in FIG. 3.

Depending on the particular formulation being mixed, the use of a binding agent may not be necessary. Of course, if no binding agent is needed, the fog zone 74 may be eliminated. Agglomeration would then occur in the mixing region 70. It may be possible to eliminate the angled ramps 76 if sufficient agglomeration occurs within the mixing region 70. However, because the particle-particle contact time within the mixing region 70 is quite brief, most applications will require the use of the angled ramps 76 to promote agglomeration in order to obtain sufficient particle size prior to passing the mixture over the angled screens 78.

FREEZE DRYING

Figure 4:
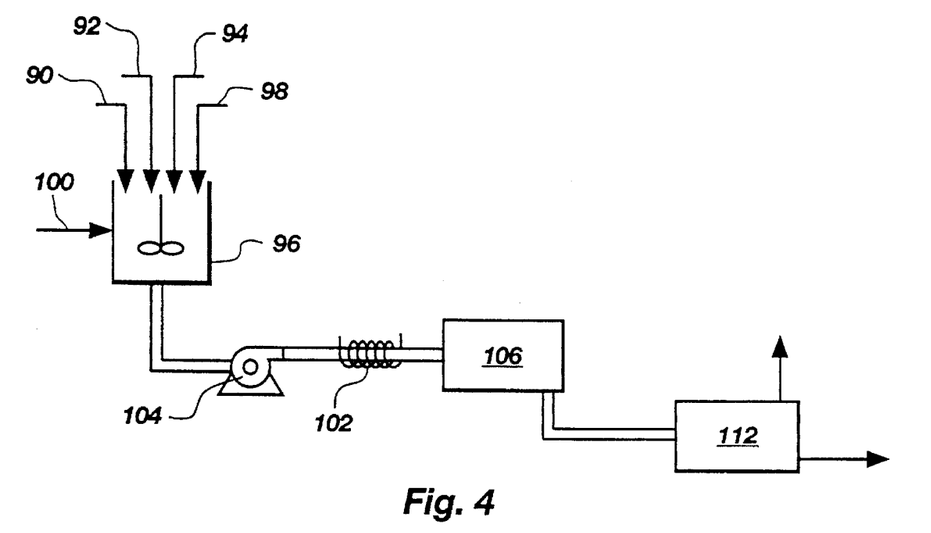
FIG. 4 is a schematic drawing of a process of the present invention which employs sublimation.

An additional method of the present invention for preparing gas generant feed stock includes initially obtaining a desired quantity of ingredients measured in predetermined ratios according to the composition of a gas generating material. As illustrated in FIG. 4, the ingredients may include a fuel 90 such as BTA and an oxidizer 92 such as copper oxide. Additives 94, such as a binding agent, may also be included.

The ingredients are placed in a mixer 96 and mixed with a solvent such as water 98 to dissolve at least a portion of at least one of the ingredients of the gas generating material. Depending on the solubility of the ingredients being mixed, it may be desirable to add some heat 100 to the mixture to improve the solubility of one or more of the ingredients. For example, when mixing BTA and copper oxide, it is preferred to heat the mixture to about 100 degrees centigrade to improve the solubility of the BTA in the water.

The mixture is then passed through a non-contact heat exchanger 102 to precool the mixture. Non-contact heat exchangers of the type employed by this method may be of any type which permit cooling of the ingredient mixture without physical contact with the cooling media of the heat exchanger. Exemplary of such heat exchangers are those known as "shell and tube," "plate and frame," and "spiral tube."

A pump 104 or other means may be used to drive the fluid flow from the mixer 96 through the heat exchanger 102. The supercooled mixture then enters a refrigeration tank 106 where it is mixed with a liquid coolant, such as carbon dioxide, ammonia or nitrogen, having a temperature in a liquid state substantially below zero degrees centigrade (or substantially below the freezing temperature of the carrier solvent, if one other than water is employed). In a presently preferred method, liquid carbon dioxide is utilized because of it is safer to work with and is available at a lower cost.

As the mixture enters the refrigeration tank 106, the water is virtually immediately frozen, thereby entrapping the ingredients in the frozen crystals of water. The refrigeration tank 106 is configured with a vent 108 to relieve the gases boiled off the liquid coolant as the relatively warm ingredient mixture is introduced into the refrigeration tank 106. By maximizing the amount of precooling in heat exchanger 102, this loss of liquid coolant is minimized. The frozen mixture is then introduced to a sublimation tank 112 which is maintained at a reduced pressure. In the sublimation tank 112, the mixture may be dried through reduced pressure boiling.

As the water supercools prior to entering the refrigeration tank 106, substantially all of the dissolved fuel (or other ingredient) becomes insoluble and falls out of solution. The energy savings which is achieved by utilizing this method is illustrated by examining the process as applied to a gas generant utilizing BTA as the fuel, copper oxide as the oxidizer and water as the solvent. At $-23°$ C. the thermal conductivity of supercooled water is 5.222 cal/°C.-cm-hr, whereas at $0°$ C. the thermal conductivity of water is 5.439 cal/°C.-cm-hr. The thermal conductivity of copper oxide at $-23°$ C. is about 2.853 cal/°C.-cm-hr, and at $0°$ C. the thermal conductivity of copper oxide is about 2.730 cal/°C.-cm-hr. This difference will preferentially cause the crystals of BTA fuel to migrate towards the copper oxide surfaces. Because the phase change occurs rapidly, the supercooling step must be performed, thereby limiting the quantity of fine particulates that form from the dissolved fuel.

After the water or other solvent has been removed by processing in the sublimation tank 112, the resulting feed stock granules may then be utilized to produce a final gas generant product.

SOLVENT EXTRACTION

Figure 5:
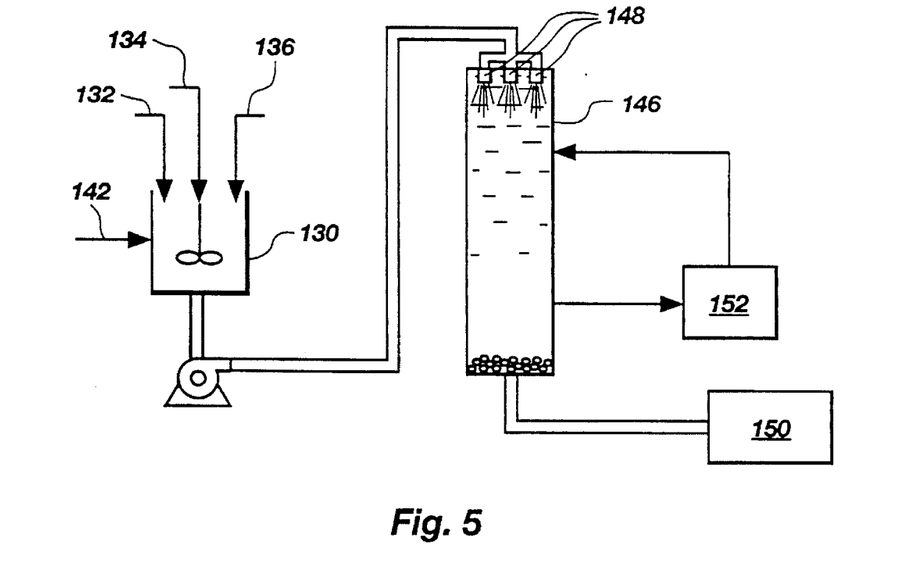
FIG. 5 is a schematic drawing of a solvent extraction process of the present invention, utilizing a drop tower.
Figure 6:
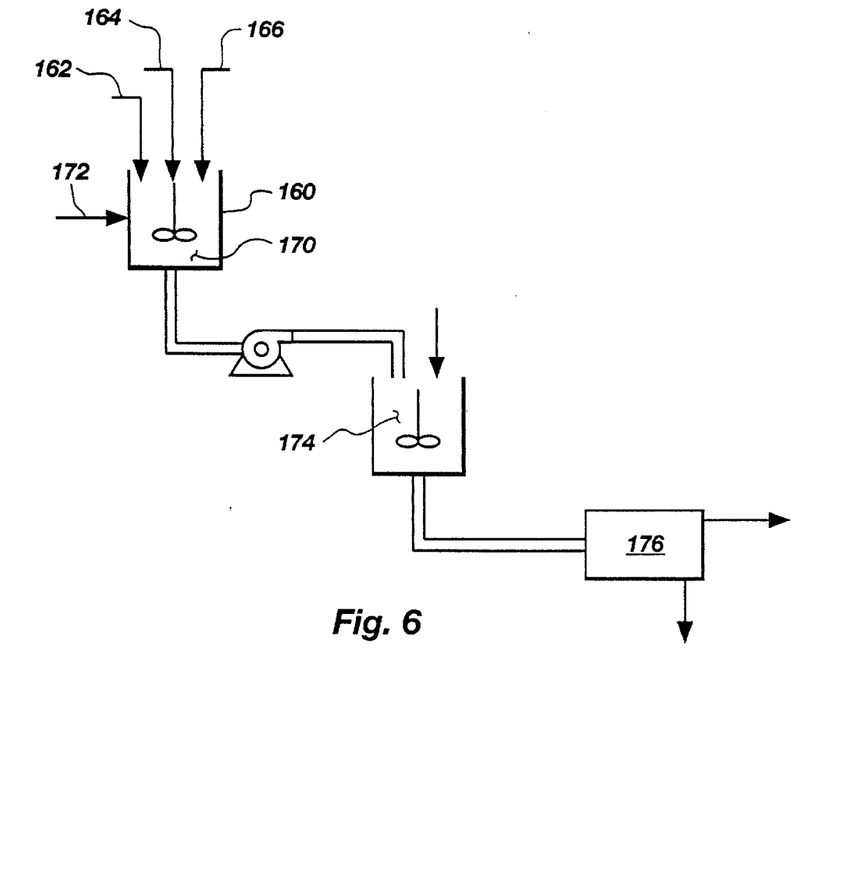
FIG. 6 is a schematic drawing of a process of the present invention which employs emulsification.
Figure 7:
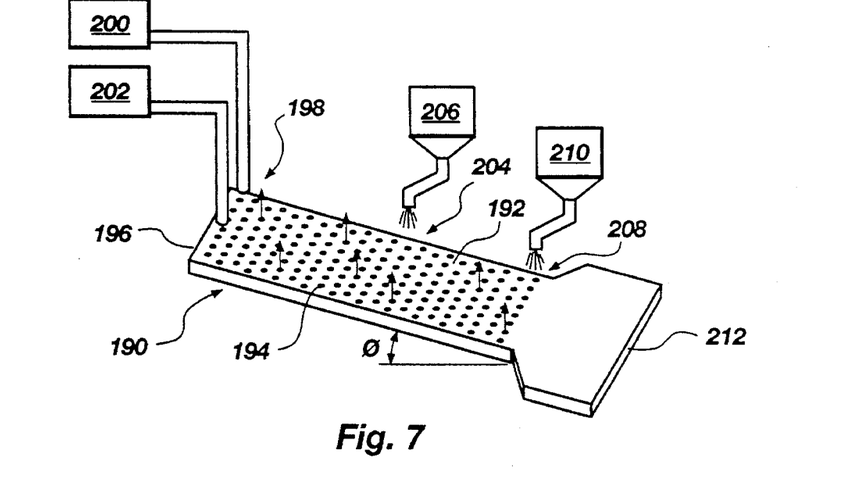
FIG. 7 is a schematic drawing of a process of the present invention which employs a fluidized bed.

A further method for preparing gas generant feed stock according to the teachings of the present invention comprises initially obtaining a desired quantity of ingredients measured in predetermined ratios according to the composition of a gas generating material. The ingredients are introduced into a mixer 130, as illustrated in FIG. 5. The ingredients may include a fuel 132 such as BTA and an oxidizer 134 such as copper oxide. Additives 136, such as a binding agent, may also be included.

The ingredients are placed in mixer 130 and mixed with a carrier solvent such as water or methylene chloride. In this preferred method, water 138 is utilized. Hence, the ingredients are mixed in the water 138 to dissolve at least a portion of at least one of the ingredients of the gas generating material in the water to thereby form a first solution 140 in which at least one of the gas generant ingredients is dissolved and the remaining ingredients are suspended. Depending on the solubility of the ingredients being mixed, it may be desirable to add some heat 142 to the mixture to improve the solubility of one or more of the ingredients. For example, when mixing BTA and copper oxide, it is preferred to heat the mixture to about 100 degrees centigrade to improve the solubility of the BTA in the water.

A second solution 144 which is miscible with the solution 140 but in which the ingredients of the gas generating material have substantially no solubility is then added to the solution 140. For example, when preparing a gas generant composition of BTA and copper oxide in water, suitable second solutions 144 include alcohols such as butanol. Ammonia and other polar solvents may also be successfully utilized as the second solution.

For continuous separation, the solution 140 is preferably introduced into the second solution 144 by utilizing a drop tower 146 which is filled with the second solution 144. The first solution 140 is preferably introduced into the second solution 144 by injecting it into the second solution through submerged nozzles 148 which disperse the first solution into small droplets.

As the droplets of the first solution 140 begin to mix with the second solution 144 in the drop tower 146, the water in the first solution 140 mixes with the second solution. Because the ingredients of the gas generant solution are not soluble in the second solution 144, the dissolved ingredients will tend to fall out of solution as the second solution 144 mixes with the first solution 140.

The presence of non-dissolved ingredients which are suspended in solution act as seeds to facilitate the precipitation out of solution of the dissolved ingredients. For example, when processing a BTA/copper oxide formulation in water, the non-soluble copper oxide acts as a seed as the BTA comes out of solution, thereby causing the BTA crystal to grow on, and bond to, the copper oxide as a coating.

The use of tactifiers or other binding agents, such as those disclosed herein, permit the agglomeration of BTA crystals to each other through mechanical bonding. Thus, any virgin BTA crystals precipitating out of solution can be bonded to other granules by the use of a binding agent.

The agglomerates of the gas generating material may then be removed from the drop tower 146. Excess water may be removed through a conventional drying process 150. The resulting feed stock is in acceptable form for powder extrusion and pellet pressing to form a final gas generant product.

The solution within the drop tower 146 may be continuously circulated through a solvent removal process 152 to separate the water from the second solution 144 through known solvent separation techniques. The second solution 144 may then be circulated back into the drop tower 146 to maintain a sufficient quantity of the second solution 144 within the drop tower 146.

This solvent extraction method may easily be utilized as a batch process by adding a quantity of the second solution 144 into the mixer 130 after the ingredients have been mixed in the first solution 140. Any dissolved ingredients will then be forced out of solution, forming a coating on other particles acting as seeds. The resulting feed stock may then be processed into a final form.

EMULSIFICATION

In accordance with an additional method of the present invention, gas generant feed stock is prepared by initially obtaining a desired quantity of ingredients measured in predetermined ratios according to the composition of a gas generating material. As illustrated in FIG. 6, the ingredients are introduced into a mixer 160. The ingredients may include a fuel 162 such as BTA and an oxidizer 164 such as copper oxide. Additives 166, such as a binding agent, may also be included.

In mixer 160, the ingredients are mixed with a carrier solvent such as water 168 to dissolve at least one of the ingredients of the gas generating material in the water to thereby form a first solution 170 in which at least one of the gas generant ingredients is dissolved and the remaining ingredients are suspended. Depending on the solubility of the ingredients being mixed, it may be desirable to add some heat 172 to the mixture to improve the solubility of one or more of the ingredients. For example, when mixing BTA and copper oxide, it is preferred to heat the mixture to about 100 degrees-centigrade to improve the solubility of the BTA in the water.

A second solution 174 which is immiscible with the solution 140 and in which the ingredients of the gas generating material have substantially no solubility is then added to the solution 170. For example, when preparing a gas generant composition of BTA and copper oxide in water, suitable second solutions 174 include trichloroethane, tetrachloroethane and nonane.

The mixture of the first solution 170 and the second solution 174 are then physically emulsified. Mixers capable of performing the emulsification are readily known in the art. Both in-line mixers for use with a continuous process as well as batch mixers are commercially available. Such mixers are generally categorized as turbine agitators with peripheral speeds of about 3.30 to about 3.56 m/s.

The ingredients of the gas generating material may then be collected through a separation process 176. Separation of the ingredients is preferably carried out by employing centrifugal separation. Alternatively, a settling or coalescing tank may be utilized in conjunction with in-line coalescers. Because the ingredients of the gas generant solution are not soluble in the second solution 174, they will fall out as the water is emulsified with the second solution. As they fall out, substantial particle-particle contact among the various ingredients will occur, resulting in agglomeration of the particles. The size of the particles may be controlled by controlling the temperature and respective concentrations of the liquids at which the emulsification occurs.

Excess water may be removed through a conventional drying process 178. The resulting feed stock is in acceptable form for powder extrusion and pellet pressing to form a final gas generant product.

AZEOTROPIC DISTILLATION

This method of the invention may advantageously be utilized in combination with other methods as an economical process for drying gas generant ingredients. Also, this method may be used independently to produce feed stock. According to this method, gas generant feed stock is prepared by initially obtaining a desired quantity of ingredients measured in predetermined ratios according to the composition of a gas generating material.

The ingredients are mixed by conventional methods with a first solvent (generally water) such that at least a portion of at least one of the ingredients of the gas generating material becomes dissolved in the first solvent. This mixture, e.g., fuel, oxidizer, water and other additives such as those described herein for use in gas generant compositions, is in the form of a slurry.

A small quantity of a second solvent is then added to the mixture and blended with the mixture. The second solvent is selected to be miscible with the first solvent and to form an azeotrope with the first solvent. The amount of the second solvent which is added to the mixture must be restricted to ensure that any ingredients which may have dissolved in the first solvent do not fall out of solution. This concern is avoided if the second solvent is selected such that any dissolved ingredients are also soluble in the second solvent. In a system using water as the first solvent, some acceptable solvents which may be successfully used as the second solvent include benzene, toluene, ethanol, propanol, etc.

As the solvents are azeotropically removed from the mixture, the concentration of the soluble fuel and/or other ingredients will reach a state of super saturation. Thus, the dissolved materials will quickly crystallize out of solution and form a coating on the surface of the insoluble ingredients.

The combined ingredients are then reduced pressure distilled or thermal distilled to remove both solvents, thereby producing an anhydrous feed stock. Importantly, the amount of energy to completely form the anhydrous feed stock is less than that required by most known methods. Hence, this method may advantageously be utilized as a method for drying hydrated gas generant compositions.

The resulting feed stock is in acceptable form for powder extrusion and pellet pressing to form a final gas generant product.

SPRAY DRYING

An additional method for preparing gas generant feed stock according to the teachings of the present invention comprises initially obtaining a desired quantity of ingredients measured in predetermined ratios according to the composition of a gas generating material. The ingredients are mixed with a carrier solvent such as water to dissolve at least a portion of at least one of the ingredients of the gas generating material in the water with the rest of the ingredients remaining suspended in solution. Depending on the solubility of the ingredients being mixed, it may be desirable to add some heat to the mixture to improve the solubility of those ingredients being dissolved. For example, when mixing BTA and copper oxide, it is preferred to heat the mixture to about 100 degrees centigrade to improve the solubility of the BTA in the water.

Some advantages are obtained by utilizing a solvent other than water. For example, by utilizing liquified ammonia as the solvent, thermal sensitivity concerns may be reduced. Also, the energy required to process the material into feed stock may be less for a mixture in liquified ammonia than one in water.

Additives such as binding agents, either alone or in combination with other additives disclosed for use herein, may also be included in the mixture. The mixture is then dried by spraying the mixture through an atomizer or other nozzle into an air stream or vacuum.

In the air stream or vacuum, the surface of the droplets dries first, forming a crystalline shell surrounding the remainder of the droplet. By thoroughly mixing the ingredient mixture prior to spray drying, most droplets will carry non-dissolved ingredients. Consequently, the non-dissolved ingredients will be enclosed within the crystalline shell which forms as the water in the droplet dries. The non-dissolved ingredients act as seeds to promote the formation of crystals on the seeds as the water dries. Upon further drying of the droplet, the remainder of the dissolved ingredients will crystallize ultimately forming a very fine crystalline structure including both fuel and oxidizer.

By including a binding agent, droplets which do not include any non-dissolved ingredients will not fall apart upon drying. Also, particle-particle contact between particles in the air stream during the drying process will also result in some agglomeration of particles if a binding agent is utilized.

The agglomerates may then be collected and used as feed stock and pressed into pellets, extruded and cut into pellets, or otherwise formed into a desired shape.

FLUIDIZED BED

A further method of the present invention for preparing feed stock of a gas generant material having a non-azide based fuel is accomplished by initially obtaining a desired quantity of ingredients measured in predetermined ratios according to the composition of the gas generating material. As illustrated in FIG. 7, the ingredients are introduced into a fluidized bed 190.

The fluidized bed 190 which is utilized according to the teachings of this method of the invention may be any of those fluidized beds which are commercially available. Such fluidized beds are ideally operated as a continuous process. While capable of operating as a batch process, such a process would require the processing of a large amount of material to obtain an acceptable production rate. When processing energetic materials, such as the gas generant materials produced according to the teachings of the present invention, processing large quantities of material at once can pose a safety hazard. Hence, it is presently preferred to operate the fluidized bed as a continuous process. When operating the fluidized bed in a continuous process, it is estimated that less than about 500 pounds of ingredients of in-process material would be employed for a 200 pound per hour production process.

As illustrated in FIG. 7, typical fluidized beds consist of a long planar surface 192 which is configured with many small holes 194 through which a fluid, typically ambient air, may be pumped at a pressure of about three to four psi. The planar surface 192 is conventionally mounted at an angle $\phi$ to the horizontal of about four degrees, thereby permitting the force of gravity to urge the material being processed to travel from one end of the bed to the other. Alternative configurations of fluidized beds utilize air injection at differential pressures to produce a horizontal driving force which urges the material along the fluidized bed. Such alternative configurations may also be employed according to this method of the invention.

In operation, the ingredients are introduced at an inlet end 196 of the bed 190 into a first zone 198 where the ingredients are mixed together. The ingredients are preferably introduced into the fluidized bed in a dry state through the use of loss-in-weight feeders. For example, a feeder for fuel 200 and a feeder for an oxidizer 202 may be utilized. One of skill in the art will appreciate that a variety of types of feeders may be employed for this purpose. And, for some types of compositions, it may be desirable to pre-mix the ingredients prior to introducing them to the fluidized bed, thereby eliminating the need to use multiple feeders. Alternatively, one or more of the ingredients may be dissolved in a solvent and introduced into the fluidized bed in liquid form.

Once the ingredients have passed through the first zone 198 where they are mixed together, they enter a second zone 204 where a solvent 206 is introduced into the mixture to facilitate agglomeration. A binding agent may also be added at this point, preferably by dissolving it in the solvent. Water will generally be the solvent of choice because of its low cost. The water is added at a temperature of from about 60 to about 100 degrees centigrade, and preferably at a temperature no greater than about 85 degrees centigrade. While continuing to operate the fluidized bed in the second zone 204, further mixing of the ingredients results in agglomeration of the ingredients.

Finally, the ingredients enter a third zone 208 where a flow agent 210, along with other additives, may be added to the mixture. In the third zone 208, the water is removed from the mixture. This may be done by preheating the air which is injected through the holes 194 in the planar surface 192 at the third zone 208 of the bed. Alternatively, non-contact heat exchanging surfaces may be used to provide added energy to evaporate the excess water. The pressure at which the gas media is injected through the holes in the bed should be reduced in the third zone 208, thereby ensuring that agglomerates which have been formed are not broken up by excessive mixing in the third zone.

The dried agglomerates may then be removed from the discharge end 212 of the bed and processed into a final gas generant product.

PARTICLE GRINDING

A further method of the present invention for preparing feed stock of a gas generant material, particularly a gas generant material having a non-azide based fuel, is accomplished by initially obtaining a desired quantity of ingredients measured in predetermined ratios according to the composition of the gas generating material. The ingredients may include a fuel, an oxidizer and any suitable additives. The additives may include any of those additives discussed herein such as a combination of binding agents or flow agents. This method is particularly suited for use when preparing gas generant materials from raw materials in an agglomerated form.

The ingredients are introduced into a particle size reduction device. Among those devices suitable for use according to this method of the invention are ball mills, pin mills, hammer mills, fluid energy mills, stator mills and ultrasonic grinders. As the ingredients are being ground, they are also being mixed.

This method may also advantageously be employed to enhance the burn rate of a gas generant composition. By reducing the particle size of the gas generant composition, higher burn rates may be achieved. This method can be combined with other processes described herein to prepare a gas generant feed stock.

From the foregoing, it will be appreciated that it the present invention provides methods for processing gas generant compositions to produce feed stock which can economically and efficiently be pressed to form a gas generant tablet which will readily release form the die and have sufficient crush strength to meet industry standards.

The methods of the present invention permit gas generant compositions, particularly new, non-azide based compositions, to be processing in bulk quantities to achieve precise compositions on a macro-molecular level.

It should be appreciated that the methods of the present invention are capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for preparing gas generant feed stock, comprising the steps of:
   obtaining a desired quantity of ingredients measured in predetermined ratios according to the composition of a gas generating material;
   mixing together the ingredients of the gas generating material in a carrier solvent wherein at least one of the ingredients of the gas generating material becomes dissolved in the solvent;
   freezing the carrier solvent;
   applying sufficient quantities of heat while controlling the pressure to cause sublimation of the frozen solvent, thereby inducing the ingredients to fall out of solution;
   including a binding agent in the mixture in sufficient quantities that the ingredients of the gas generating material will agglomerate to form non-curable, agglomerated granules as the ingredients are mixed; and
   compacting the agglomerated granules to form a predetermined shape.

2. A method for preparing gas generant feed stock as defined in claim 1, wherein the gas generating material includes a non-azide based fuel.

3. A method for preparing gas generant feed stock as defined in claim 1, wherein the carrier solvent comprises water.

4. A method for preparing gas generant feed stock as defined in claim 1, wherein the freezing step includes the step of freezing the mixture in a refrigerant liquid.

5. A method for preparing gas generant feed stock as defined in claim 4, wherein the refrigerant liquid is selected from the group comprising nitrogen, ammonia and carbon dioxide.

6. A method for preparing gas generant feed stock as defined in claim 4, wherein the step of freezing the mixture in a refrigerant liquid is preceded by the step of supercooling the mixture under pressure in a non-contact heat exchanger.

\* \* \* \* \*